United States Patent Office 3,039,047
Patented June 12, 1962

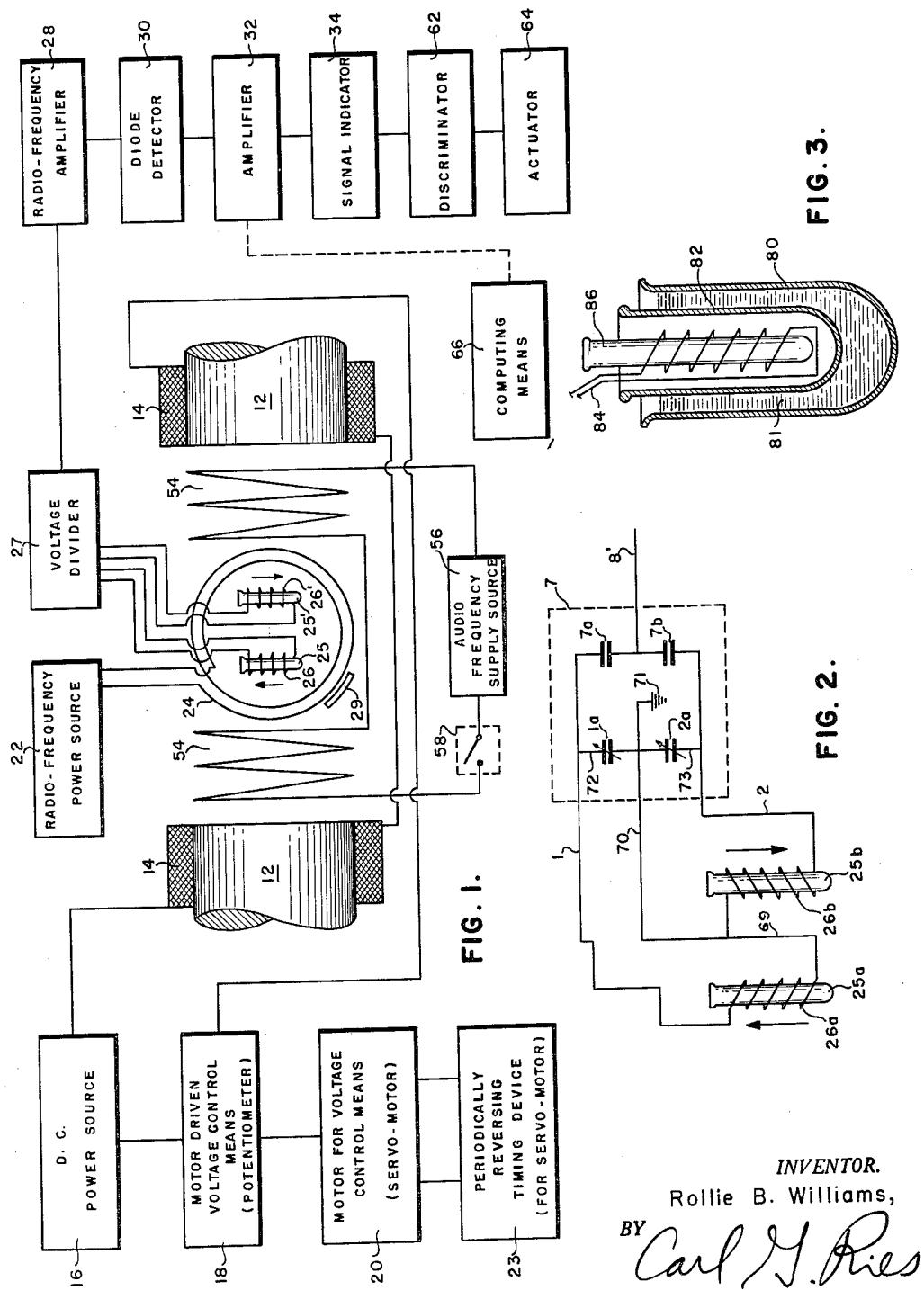

3,039,047
SPECTROMETER
Rollie B. Williams, Baytown, Tex., assignor, by mesne assignments, to Esso Research and Engineering Company, Elizabeth, N.J., a corporation of Delaware
Filed Sept. 10, 1956, Ser. No. 609,031
2 Claims. (Cl. 324—.5)

This invention relates to a magnetic resonance spectrometer for comparing a pair of samples having a nuclear species in common. More particularly, the present invention is directed to a magnetic resonance spectrometer for obtaining a signal constituting a direct comparison of a pair of samples having a nuclear species in common.

This invention is a continuation-in-part of application Serial No. 512,115 for R. K. Saunders and R. B. Williams, filed May 31, 1955.

In general, in conducting a nuclear magnetic resonance spectroscopic analysis, a nuclear species contained in a sample holder surrounded by an inductance coil is polarized in a unidirectional primary magnetic field which is crossed at right angles by a radio-frequency alternating magnetic field. Members of a nuclear species susceptible to magnetic resonance (i.e., nuclear paramagnetic resonance, commonly referred to as nuclear magnetic resonance, or electronic paramagnetic resonance, commonly referred to as paramagnetic resonance) will, when polarized in a primary magnetic field of a given strength, precess in resonance over a determinable band of precession frequencies within the radio-frequency range, which precession band, for a given radio-frequency, will change in amplitude when the strength of the primary magnetic field is changed. Therefore, by changing the strength of the primary magnetic field, the frequency of the R.F. field, or both, the resonance band (i.e., band of precession) of a nuclear species may be magnetically scanned to cause a resonance precession of the nuclear species and such precession may be detected by measurement of the voltage induced in the inductance coil. Thus, for example, by providing an R.F. field of substantially constant frequency and by progressively increasing the strength of the primary magnetic field from an initial value insufficient to cause precession at the applied radio-frequency, the requisite correlation of primary field strength with radio-frequency will be established and the nuclear species under consideration will therefore be caused to precess during such a scanning operation.

It is frequently desirable to compare samples containing a common nuclear species by magnetic resonance spectroscopy such as, for example, when it is desired to determine the quantity of nuclear species contained in one of the samples in the manner disclosed, for example, in the aforesaid Saunders et al. application Ser. No. 512,115, or in the manner disclosed in the Williams application Ser. No. 609,030, filed September 10, 1956, said application being a continuation in part of application Ser. No. 512,-115.

Accordingly, an object of the present invention is the provision of a magnetic resonance spectrometer comprising means for comparing a pair of samples containing a common nuclear species.

Another object is the provision of a magnetic resonance spectrometer for obtaining a signal constituting a direct comparison of a pair of samples having a nuclear species in common.

These and other objects are attained, in general, through the provision of magnetic resonance spectroscopic apparatus for comparing two samples comprising means for precessing a nuclear species common to the samples under substantially identical conditions of precession for each of the samples, means for inductively obtaining a voltage for each sample responsive to the precession of the nuclear species contained therein and means for obtaining the differential between said voltages for said samples.

In accordance with one form of the present invention, a pair of sample holders is provided in the gap between the pole pieces of a magnet for generating a primary magnetic field, such sample holders being on opposite sides of and equidistant from the center of the gap. An inductance coil is provided about each of the sample holders and the inductance coils are interconnected by a bridging circuit and wound in a manner such that, on precession of a nuclear species common to samples in each of the sample holders, the voltages induced in each of the coils will be in phase opposition whereby a voltage differential will be obtained.

In accordance with another form of the present invention, only a single inductance coil is utilized, one of the sample holders being positioned inside the coil and the other sample holder being positioned co-axially with the first sample holder and on the outside of the inductance coil. In this situation the voltages induced in the coil by precession of the nuclear species common to the two samples will be in phase opposition whereby the net effective voltage induced in the coil will constitute a differential between the opposed voltages of the two samples.

In accordance with a preferred embodiment of the present invention, one of the samples will contain a known quantity of the nuclear species and the other sample will contain an unknown quantity of the nuclear species whereby a measure of the unknown quantity may be directly obtained.

The apparatus and process of the present invention may be practiced through the provision of a magnetic resonance spectrometer of any suitable construction such as a magnetic resonance spectrometer of the inductance type, the balanced bridge type, etc. capable of obtaining a nuclear magnetic resonance signal, a paramagnetic resonance signal, or both. In essence, such spectrometers comprise (1) a large magnet for generating a unidirectional primary magnetic field, (2) a transmitter with coil means for generating a radio-frequency magnetic field at right angles to the primary magnetic field, (3) a sample holder, (4) inductance coil means comprising at least a coil coaxial with the sample holder for inductively obtaining a magnetic resonance signal, (5) a receiver for accepting the magnetic resonance signal produced at the sample location through a suitable coupling arrangement, and (6) suitable means for registering the magnetic resonance signal that is thus obtained.

The present invention will be further described in connection with the accompanying drawings wherein like numerals refer to like parts and wherein:

FIG. 1 is a schematic drawing of a nuclear magnetic resonance spectrometer of the present invention and of the wiring therefor;

FIG. 2 is a fragmentary schematic drawing illustrating in greater detail a portion of the spectrometer shown in FIG. 1; and FIG. 3 is a fragmentary schematic drawing illustrating a modified form of the present invention.

Turning now to FIG. 1, there is schematically shown a magnetic resonance spectrometer of the inductance type. It will be understood, of course, that the magnetic resonance spectrometer may also be of the balanced bridge type, the oscillating detector type, etc. The inductance type spectrometer of FIG. 1 comprises an electromagnet containing magnetic cores 12—12 surrounded by coils 14—14, the coils 14—14 being connected in series with a suitable direct current supply source 16 which provides the current to be used in generating a unidirectional primary magnetic field. For many purposes, such as for scanning operations, it is desirable to provide suitable means for periodically varying the strength of the current flowing through the coils 14—14, such means comprising, for example, a suitable voltage control means 18, such as a potentiometer of the so-called "Helipot" type, which is provided with a servo-motor 20 for periodically reversing the direction of voltage change in response to a signal derived from a timing mechanism 23. A radio-frequency power source 22 is provided for transmitting a radio-frequency signal through a transmission coil 24. A pair of sample holders 25 and 25' are also provided, the sample holders 25 and 25' being surrounded by inductance coils 26 and 26', respectively. The inductance coils 26 and 26' are wound and coupled in a manner such that the voltages induced thereon will be in phase opposition. Suitable mode balancing means is provided, such as a flux paddle means 29 of the type disclosed in Bloch et al., Patent No. 2,561,489, for controlling leakage flux and for providing the proper phase relationship between the voltage induced by the precessing nuclear species and the voltage induced by the leakage flux, whereby a dispersion mode signal will be obtained when the leakage and dispersion mode voltages are in phase and whereby an absorption mode signal will be obtained when the leakage and absorption mode voltages are in phase. The coils 26 and 26' are connected with suitable means for obtaining the differential between the voltages induced in the coils 26 and 26', such as a voltage divider 27 which, in turn, leads to a radio-frequency amplifier 28. The radio-frequency amplifier 28 is, in turn, connected with suitable detecting means such as a diode detector 30 which, in turn, is connected to amplifier 32 for amplifying the signal transmitted from the detector 30. A signal indicator 34 of any suitable construction, such as a cathode ray oscilloscope, a strip chart recorder, a voltmeter, etc., is connected to the amplifier 32 for indicating the signal transmitted therefrom.

It is frequently desirable to modulate the primary magnetic field generated between the pole pieces 12—12. For this purpose, for example, there may be provided a pair of modulating coils 54—54 connected in series with an audio-frequency supply source 56 by means of a circuit including a switch 58. Structurally, the axis of the radio-frequency transmitter coil 24 is positioned at right angles to the axis of the pole pieces 12—12. In addition, the axes of the inductance coils 26 and 26' are positioned at right angles to both the axis of the radio-frequency transmitter coil 24 and the axis of the pole pieces 12—12. The inductance coils 26 and 26' surrounding the sample holders 25 and 25' are spaced at equal distances from the center of the gap between the pole pieces 12—12. The coils 26 and 26' should be symmetrically disposed with respect to magnet pole faces, transmitter coils, and modulation coils 54—54, and may be, for example, either in a plane parallel to or perpendicular to the magnet pole faces 12—12.

In conducting an analysis in accordance with the present invention, a first sample containing, for example, an unknown quantity of nuclear species is placed in one of the sample holders (i.e., holder 25) and a second sample containing, for example, a known quantity of a nuclear species is placed in the other sample holder (e.g., sample holder 25'). The direct current power source 16 is actuated to generate a unidirectional magnetic field between the poles 12—12 in order to polarize the nuclear species contained in the samples 25 and 25'. If desired, the unidirectional magnetic field may be modulated by closing the switch 58 in order to generate a modulating audio-frequency magnetic field in the coils 54—54. At the same time, a radio-frequency magnetic field at right angles to the unidirectional magnetic field is transmitted through the transmitter coil 24.

The resonance band of the nuclear species under consideration is scanned by varying the unidirectional magnetic field, the transmitter frequency, or both. Preferably, the transmitter frequency is held constant and the unidirectional field is varied. When scanning is to be accomplished by varying the strength of the unidirectional primary magnetic field, the timing device 23 is set to actuate the motor control 20 for the voltage control means 18 so that the strength of the magnetic field will be varied over a predetermined period of time to an extent sufficient to cause a scanning of the resonance band of the nuclear species. When the resonance band of the nuclear species is scanned, the polarized nuclei in the unidirectional magnetic field will be caused to precess and thereby to induce a voltage in the coil surrounding them, which voltage, superimposed upon the voltage induced by the leakage flux from the transmitter coil, is indicated by a net change in over-all voltage across the coil. As a result, the change in voltage across coil 26 will be indicative of the concentration of the resonating nuclear species contained in sample holder 25 and the change in voltage across the coil 26' likewise will be indicative of the concentration of the corresponding resonating nuclear species contained in the sample holder 25'.

As indicated, the inductance coils 26 and 26' are connected with suitable means such as a voltage divider 27 to obtain a voltage differential. As a result, a signal is obtained which is indicative of the voltage differential between the induced voltage of the coil 26 and the induced voltage of the coil 26'. The signal obtained in the voltage divider 27 is amplified by radio-frequency amplifier 28 and is detected in detector 30. The detected signal from the detector 30 is amplified by amplifier 32 and recorded, displaced, or otherwise registered by a signal indicator 34.

The characteristics of the nuclear magnetic resonance signal obtained in the detector 30 will depend upon the manner in which the nuclear magnetic resonance spectrometer is operated. Thus, an absorption mode signal or dispersion mode signal may be obtained. The manner in which these and similar type signals are obtained is well known to those skilled in the art and has been described in many publications including, by way of illustration only, articles such as "Magnetic Resonance" (K. K. Darrow, Bell System Technology Journal, vol. 32, pages 74–79 and 384–405, 1953), "Nuclear Magnetism" (Felix Bloch, American Scientist, vol. 43, January 1955, pages 48–62), "Fundamentals of Nuclear Magnetic Adsorption" (G. E. Pake, American Journal of Physics, vol. 18, No. 7, 1950, pages 438–452, and vol. 18, No. 8, 1950, pages 473–486), etc.

Many advantages are obtained when the process of the present invention is conducted in the just-described manner. Thus, a signal may be obtained which is an actual measurement of the quantity of a nuclear species contained in an unknown sample. In addition, a more accurate measurement is obtained in that errors due to unwanted operational variables are minimized. For example, during operations random variations in primary magnetic field strength, modulation field intensity, radio-frequency power or frequency, etc. will occasionally occur which will introduce errors into direct quantitative measurements. These variations are normally slight and will affect results by a factor of about 10% or less. The error of the differential signal of the present invention on an absolute basis with reference to the sample signal is reduced by a factor equal approximately to the ratio of the differential signal to the absolute value of the sample signal.

When the signal indicator 34 is a peak reading type device capable of transmitting a signal responsive to the maximum voltage transmitted thereto from the amplifier 32, such signal may be directly utilized for a variety of purposes. Thus, for example, the output signal transmitted by the signal indicator 34 may be passed to a suitable discriminating means such as the discriminator 62 capable of transmitting a first transmitter signal if the maximum voltage of the output signal of the indicator 34 is less than a predetermined amount, or capable of transmitting a second discriminator signal if the maximum voltage of the output signal of the indicator 34 is more than a predetermined maximum voltage, or both. The discriminator signal is transmitted to an actuator 64 capable of energizing a suitable control means (not shown) in response to the discriminator signal, whereby the control member can be actuated if the signal transmitted from the signal indicator 34 is either less or greater than a predetermined allowable voltage range.

Alternatively, the output signal of the indicator 34 may be transmitted to suitable electrically actuated, electrical, mechanical and/or electronic computing means 66, as shown by the dotted lines.

A specific example of a nuclear magnetic resonance spectrometer constructed in accordance with this form of the invention is schematically shown in FIG. 2. In FIG. 2 there is shown only a portion of the apparatus illustrated in FIG. 1, this having been done to simplify the drawing. With reference to FIG. 2, inductance coils 26a and 26b are shown around sample holders 25a and 25b, respectively, of a magnetic resonance spectrometer. The inductance coils 26a and 26b are wound in a manner such that the voltages induced therein are in phase opposition, as indicated by the arrows and are connected in series by an electrical connection 69 provided with a tap 70 leading to a ground 71. Electrical lead 1 from the inductance coil 26a and electrical lead 2 from the inductance coil 26b are connected with a voltage divider 7, as indicated by the dotted lines, containing capacitors 7a and 7b and a tap 8' leading to a suitable radio-frequency amplifier (not shown). Electrical leads 1 and 2 are bridged by means of connections 72 and 73 containing tunable condensers 1a and 2a, respectively, connections 72 and 73 being connected with the tap 70 leading to the ground 71. The tunable condensers 1a and 2a are tuned to a frequency which is the same as the frequency transmitted by a radio-frequency transmission coil (not shown). The signal that is obtained is, in effect, the algebraic differential between the signals generated in the coils 26a and 26b.

It will be apparent to those skilled in the art that the above-described circuit is illustrative of but one of the many different circuit arrangements which may be provided for generating voltages in the inductance coils 26a and 26b having voltages in phase opposition and for obtaining the voltage differential therebetween.

Another embodiment of the present invention is schematically illustrated in FIG. 3. FIG. 3 is restricted to a diagrammatic illustration of another manner in which a pair of samples may be arranged, the sample holder arrangement of FIG. 3 being suitable for use in a magnetic resonance spectrometer of any suitable construction, such as, for example, a spectrometer of the type shown in FIG. 1.

In FIG. 3 there is shown a first sample holder 80 having positioned therein spacing means such as a second tube 82 for holding an inductance coil 84 and for positioning such inductance coil coaxially with the axis of the sample holder 80 but interiorly of the sample 81 in the sample holder 80, whereby the inductance coil 84 is surrounded by an annular body of sample material in the sample holder 80. A second sample holder 86 is positioned within the inductance coil 84 so as to be coaxial with the inductance coil 84 and the first sample holder 80. As a consequence, if a nuclear species common to samples in the sample holders 80 and 86 is caused to precess, a signal will be generated in the coil 84 constituting a differential between the voltages induced by precession of the nuclear species in sample holders 80 and 86, respectively. A differential will be obtained because the voltage induced in the coil 84 by precessing nuclei of the sample in the sample holder 80 will be in phase opposition to the voltage induced in the coil 84 by precessing nuclear species of the sample in the sample holder 86. It is seen, therefore, that a sample holder arrangement of the type shown in FIG. 3 constitutes an advantageous construction in that only one inductance coil need be provided and in that coaxial alignment of the two samples and the inductance coil will more positively assure the provision of substantially identical conditions of precession at each sample holder location.

What is claimed is:

1. In a magnetic resonance spectrometer, the improvement which comprises a pair of spaced coaxially aligned sample holders in the spectrometer for holding a pair of samples having a nuclear species in common, and an inductance coil coaxial with said sample holders in the space therebetween so that a signal is generated from the coil constituting a differential between the voltages induced by precession of said nuclear species in said sample holders, means for scanning the resonance band of the said nuclear species in the said samples in the said sample holders and signal detecting and receiving means connected with said inductance coil.

2. In a magnetic resonance spectrometer, the improvement which comprises a first sample holder for a first sample, a second sample holder coaxially positioned within said first sample holder for a second sample having a nuclear species common to the first sample, means for spacing said first sample holder from said second sample holder, and an inductance coil in said space between said sample holders coaxial with said sample holders so that a signal is generated from the coil constituting a differential between the voltages induced by precession of said nuclear species in said first and second sample holders, means for scanning the resonance band of said nuclear species in said samples and signal detecting and receiving means connected with said inductance coil.

References Cited in the file of this patent

UNITED STATES PATENTS

| | | |
|---|---|---|
| 2,764,536 | Hutchins | Sept. 25, 1956 |
| 2,837,649 | Hershberger | June 3, 1958 |
| 2,845,595 | Leete | July 29, 1958 |

FOREIGN PATENTS

| | | |
|---|---|---|
| 745,873 | Great Britain | Mar. 7, 1956 |

OTHER REFERENCES

Malling: Electronics, April 1953, pp. 184–187, 324– 0.5.

Anderson et al. and Bloch et al.: Physical Review, vol. 71, No. 6, March 1947, pp. 372 to 374.

Reilly et al.: Physical Review, vol. 98, No. 1, April 1955, pp. 264 and 265.

Wertz: Chemical Reviews, vol. 55, No. 5, October 1955, pp. 893 and 894 relied on.

Gutowsky et al.: The Journal of Chemical Physics, vol. 19, No. 10, October 1951, pp. 1259 to 1267.

Levinthal: Physical Review, vol. 78, No. 3, May 1950, pp. 204–213.

Zimmerman: Physical Review, vol. 76, No. 3, Aug. 1, 1949, pp. 350 to 357.

Smaller: Physical Review, vol. 83, No. 4, Aug. 15, 1951, pp. 812 to 820.

Broersma: Journal of Chemical Physics, vol. 24. No. 1, January 1956, p. 155 principally relied upon.